United States Patent [19]

Aspden

[11] Patent Number: 4,975,608
[45] Date of Patent: Dec. 4, 1990

[54] SWITCHED RELUCTANCE MOTOR WITH FULL ACCOMMUTATION

[76] Inventor: Harold Aspden, Acres High, Hadrian Way, Chilworth, Southampton, S01 7HZ, England

[21] Appl. No.: 393,374

[22] Filed: Aug. 14, 1989

Related U.S. Application Data

[63] Continuation-in-part of Ser. No. 197,624, May 23, 1988, abandoned.

[51] Int. Cl.$^5$ .................. H02K 21/28; H02K 21/38; H02P 8/00
[52] U.S. Cl. .................................. 310/114; 310/166; 318/696; 318/700
[58] Field of Search ............... 310/114, 124, 166, 181, 310/186, 217, 261, 264, 269; 318/138, 685, 696; 323/235, 319, 700

[56] References Cited

U.S. PATENT DOCUMENTS

| | | | |
|---|---|---|---|
| 3,307,094 | 2/1967 | Ogle | 318/810 |
| 3,483,410 | 12/1969 | Siegelman et al. | 310/181 |
| 3,535,572 | 10/1970 | Rugeris | 310/114 |
| 4,320,330 | 3/1982 | Bahr et al. | 318/685 |
| 4,500,824 | 2/1985 | Miller | 318/701 |
| 4,567,407 | 1/1986 | Ecklin | 318/140 |
| 4,611,157 | 9/1986 | Miller et al. | 318/696 |
| 4,772,839 | 9/1988 | MacMinn et al. | 318/696 |

Primary Examiner—Steven L. Stephan
Assistant Examiner—D. L. Rebsch

[57] ABSTRACT

A reluctance motor is powered by a commutated ac voltage supply which comprises full cycles of the ac waveform interspersed with periods of zero power of fixed duration measured in full cycles. Motor structures are described which combine, with the above method of excitation, a feature by which a portion of the magnetic circuit carrying the magnetic flux developing reluctance drive torque during the power-on periods is magnetized cyclically over a range above the knee of the application B-H curve. A closed circuital dc flux path through this portion and separate from the ac flux route through the stator poles is magnetized as by permanent magnets to secure this near-saturation condition in which thermodynamic adiabatic cooling processes operate to enhance the power conversion efficiency of the motor by virtue of domain flux rotation processes.

15 Claims, 3 Drawing Sheets

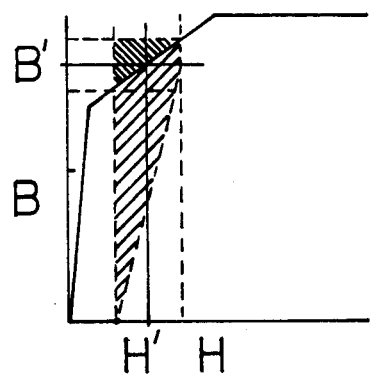
FIG. 4
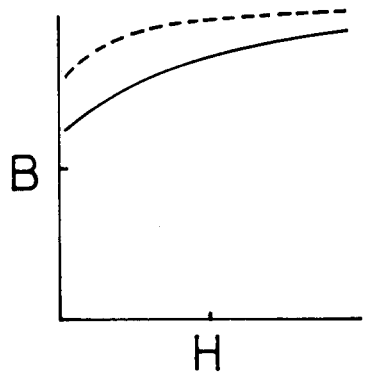
FIG. 5
FIG. 6
FIG. 7
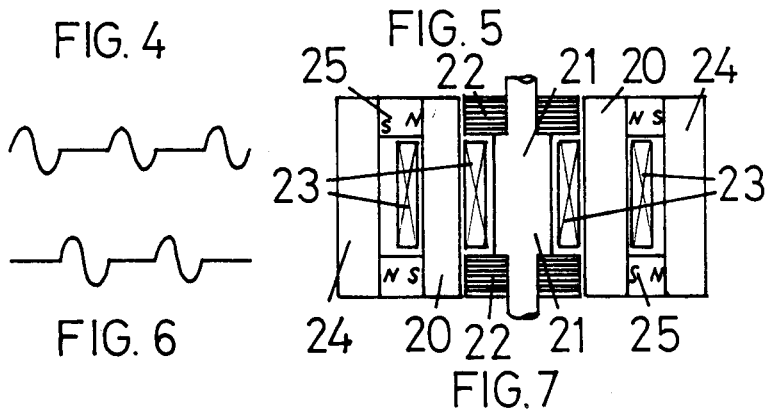
FIG. 8

FIG. 9
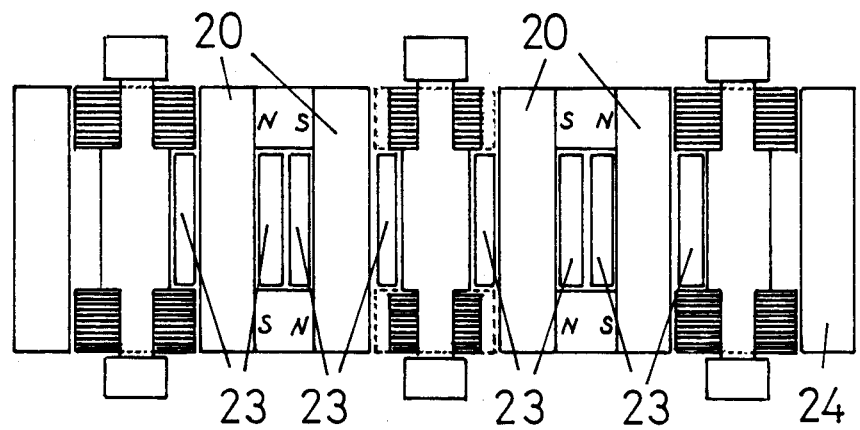
FIG. 10
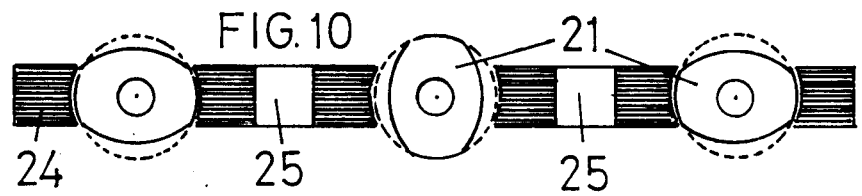
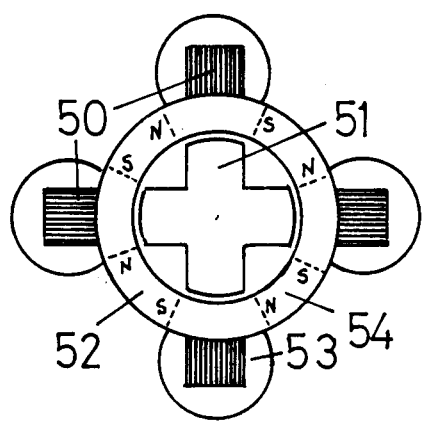
FIG. 11
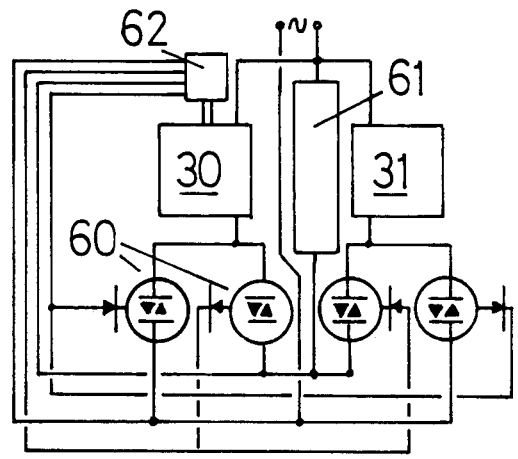
FIG. 12

SWITCHED RELUCTANCE MOTOR WITH FULL ACCOMMUTATION

BACKGROUND OF THE INVENTION

This application is a continuation-in-part of U.S. Ser. No. 197,624, filed May 23, 1988, now abandoned.

This invention relates to switched reluctance motors which may also function as electrical power generators by virtue of full cycle ac commutation operative between the two functions.

Usually motor-generator systems involve the mechanical coupling of a motor and a generator, each of conventional form, though the apparatus may have features such as the use of a common rotor assembly and two bearings common to both the motor and the generator.

In one of its aspects this invention is based upon the recognition that there are advantages in using a common ferromagnetic stator-rotor system for both the motor and the generator functions. Such a proposal is of prior record, as in Ecklin's U.S. Pat. No. 4,567,407 dated Jan. 28, 1986, but in this earlier proposal the windings which relate to the motor and generator functions are separated and are wound on different parts of the stator structure associated with their separate functions. To achieve the optimum advantage from the use of the common stator-rotor system it has been found that the two windings should be closely coupled inductively but that current flow resulting from direct inductive interaction between the windings should be prevented.

Alternatively, provided appropriate switching techniques are used, a common winding can serve for both the motor and generator functions. In either case, there is a fundamental distinction with regard to the Ecklin disclosure in that Ecklin relies on the simultaneous generation of electrical power output whilst there is electrical power input. In contrast, the invention to be described relies, in respect of one of its implementations, on an ac excitation using distinct time-separated motor and generator functions of the active winding or windings with energy transfer being via the intermediary of the kinetic energy of the rotor.

The invention to be described should not be confused with machines in which a salient pole structure is used with input and output windings on the pole pieces, acting merely as transformer windings responsive to flux changes produced as the rotor turns. The invention expressly excludes the possibility of a direct energy transfer by transformer action between inductively coupled windings, as would occur in this situation.

The physical principle upon which this invention works is that the energization of the motor develops reluctance drive torque on the rotor and causes remanent magnetic energy to be retained by the rotor as it passes through in-register positions of the stator and rotor poles. The inertia imparted to the rotor during the times when the poles are moving into register then carries the rotor over the range of its travel where it may act as a generator by inducing an output current in a winding that sets up a reaction field and draws also on the remanent magnetic energy stored in the rotor.

The prior art does include a proposal by Miller in U.S. Pat. No. 4,500,824 dated Feb. 19, 1985, which relates to a reluctance motor powered by a dc source. This concerns the maximization of power output, whilst avoiding magnetic saturation and excessive iron losses. The design seeks to limit the peak current whilst securing a more effective magnetic flux profile as the salient poles come into register. The commutation process achieves this by feeding dc power back to the dc source by appropriate switching of the reluctance motor drive, but does this in a stage in advance of the stator and rotor poles coming fully into register.

In contrast, the implementation of the invention now being discussed is expressly concerned with the segregation of the input power and the output power as between the periods when all the stored magnetic energy has been fed back inductively to the supply or converted into kinetic energy of rotor motion. Furthermore, the invention is expressly concerned with a basic ac excitation and not a switched dc source, inasmuch as the eddy component of iron losses, even where magnetic flux change is distorted by saturation, is minimal if the magnetic flux is produced by a simple harmonic ac excitation voltage with, so far as this is at all possible, none of the higher harmonic components as inevitably arise from a pulsed D.C. source.

The commutator control may have the form described in the specification of the U.S. patent application of which this application is a continuation-in-part, namely Ser. No. 07/197,624 filed on May 23, 1988.

Such a commutator control utilizes an alternating power source and operates to restrict the excitation of the motor energizing windings to a sequential selection of single complete cycles of the alternating power. By appropriate design of the machine, this permits commutation at times when both the voltage and current in the energizing windings are passing through a zero value.

The concept of full cycle commutation, meaning a full operative cycle of power excitation interspersed with full time cycles with zero power input, has been suggested by Ogle in U.S. Pat. No. 3,307,094 dated Feb. 28, 1967 but only as a means of regulating the speed of induction motors or synchronous machines. Ogle does not teach the use of these intervening cycles for the express purpose of extracting electrical power from the system, which, as will be seen, is one of the objects of a particular implementation of this invention.

In these prior art machines, as suggested by Ecklin, Miller and Ogle, the objects are, respectively, to provide a compact unitized motor-alternator, a lower peak current to power ratio and improved commutation features in achieving a variable speed control. It is not foreseen from any of these disclosures that there are special advantages in using a commutation technique involving switching steps in full ac cycle periods to power a constant speed reluctance motor operating also as a generator during the power-off commutated A.C. periods.

Concerning the invention in a broader aspect, though still utilizing full cycle ac switching of a reluctance motor, the essential added feature of the invention concerns a specific form of a highly polarized magnetic operating condition. The inventor is not aware of any prior art which adds magnetic bias structure to a reluctance motor which seeks advantage by weakening the effective permeability of the operative reluctance path. In prior art admitted in the Ecklin U.S. Pat. No. 4,567,407 there is disclosure of an alternator configuration in which the salient pole rotor comes into register with stator poles which permit permanent magnets to magnetize the rotor. As the rotor turns it comes next into register with stator poles which allow the same permanent magnets to magnetize the rotor in the opposite direction. An ac output winding on the stator generates power as the rotor is driven mechanically. Presumably, this machine could operate in reverse mode as a reluctance motor powered by an ac input.

However, the permanent magnets in the Ecklin disclosure cannot serve the role foreseen by the invention now to be described, because the magnetic flux involved cycles symmetrically in its reversals about the origin of the B-H magnetization curve and there is no operative bias of the B-H curve of the kind essential to achieve the unexpected advantages of this invention. Nor, indeed, is there any suggestion of motor operation involving commutation of the ac power supply.

OBJECTS OF THE INVENTION

Although a motor-generator is described, it is to be understood that the power input and/or power output of the machine need not be exclusively in electrical power form, characteristic of an electrical conversion function. The machine can operate in a mechanical role via the drive shaft, meaning that the motor-generator can be a versatile system used essentially either as a motor or an electrical power generator, but incorporating also non-inductively coupled electrical power exchange as between the motor and generator sections of the machine. The invention has as its objective to provide a novel combination of motor excitation means and electrical power generation.

However, the primary object is to provide a novel motor-generator which can operate efficiently to harness a thermodynamic activity occurring only when the motor excitation is in a realm excluded from normal levels of magnetization.

The motor principle is at the heart of the invention. It involves a reluctance drive and so relies, not on the forces between winding currents and magnetic poles, but rather on the magnetic forces acting directly between ferromagnetic poles. The thermodynamic activity with which the invention is concerned arises only when the magnetic flux changes arise from flux rotation rather than domain wall movement and this is characterized by magnetization above the knee of the B-H curve of the controlling portions of the magnetic circuit. There is very little magnetic flux rotation in prior art motors, because they are invariably designed expressly to minimize hysteresis and eddy current loss. The range of operative magnetization is limited to the below-the-knee high permeability range of the curve of B-H magnetization of the ferromagnetic materials used in construction.

An important object of the invention is therefore to so combine features of design which minimize iron losses, whilst operating the motor-generator in an above-the-knee, nearer to a saturated, magnetic condition than is acceptable in conventional reluctance motor design. The object is to secure an overall gain from thermodynamic factors by which heat is converted into electrical power, thereby improving overall motor efficiency by regaining some power as electrical output.

It is therefore an object of the invention to implement a technique by which the naturally ordered state of the ferromagnet can draw on the disorder of thermal energy and so contribute to the power output of the motor-generator, when the latter is over-excited by an externally applied magnetic field. In a sense, the invention harnesses in a motor-generator power system the features of the adiabatic demagnetization process used in cryogenic research for very low temperature supercooling.

Such an objective has not hithertofore been contemplated by those expert in this field, because the process of cooling by adiabatic demagnetization has been regarded solely as the province of paramagnetic substances. In a sense, the primary properties of a ferromagnetic material arise from the fully saturated spontaneous magnetization state applicable within the domains in the crystal structure, and magnetization simply means displacement of domain walls with no thermodynamic implications. However, once the knee of the B-H magnetization curve is reached, the onward magnetization involves magnetic flux rotation and this involves energy exchanges which can be magneto-caloric in nature, as if the action is that of a powerful paramagnetic substance.

SUMMARY OF THE INVENTION

Experiment has shown that cyclic magnetization of a ferromagnet above the knee of the B-H curve merely heats and cools the ferromagnet with the heating exceeding the cooling by the expected hysteresis and eddy current loss. The eddy current loss is enhanced owing to domain wall inhomogeneities and time-lag effects. However, to the extent that the heating stage is partly powered by the natural polarizing currents of the ferromagnet there is then a normal reversible thermal factor involved. This heating effect can be replaced by an action which stores energy mechanically if the work done in building the magnetic polarization is usefully directed rather than allowed to dissipate as heat. By then avoiding the reverse action of doing mechanical work as the magnetic polarization is allowed to subside to its natural ferromagnetic value, the physical processes involved draw on the thermal background by adiabatic demagnetization and so can cool a motor in which this process is employed.

The reluctance motor is the device which works by virtue of magnetic poles doing mutual work, whereas induction motors and normal synchronous alternators operate by inducing back EMF in current circuits acted upon by the poles. In these latter machines, as with the Hall effect, for example, the magnetic field set up by the poles is merely a catalyst helping the current to set up the power-related force action but contributing no energy itself.

In summary, therefore, the invention to be described exploits this novel thermodynamic process in a power application and in a motor-generator design which is tolerant of higher than normal iron loss because the heat involved can be recovered to be regenerated as electrical power, with corresponding enhancement of overall motor efficiency.

According to the invention, a switched reluctance motor is powered by an ac voltage source having a frequency which is a constant integer multiple of the synchronous operating speed of the motor, and comprises a rotor and a stator, both having ferromagnetic poles which come into register cyclically at successive angular positions of the rotor, means for producing an ac magnetic flux component of a motor-driving magnetization of the poles limited in duration to a range of angular position of the rotor in advance of positions in which the poles come into register, means for harnessing the mechanical rotor torque produced, and commutator means for controlling a commutated supply of the ac voltage source operative to magnetize the poles for one full ac cycle which terminates when the poles are in register and to input no further power during an immediately following full cycle period. The motor may include additional non-commutated magnetizing means for biasing at least a portion of the flux path of the motor-driving magnetization to a state above the knee of the B-H magnetization curve.

To minimize iron loss whilst introducing a bias effect the magnetic circuit of the reluctance motor can be divided into two distinct parts which share a common portion in which cross flux conditions apply.

Thus, according to a feature of the invention, the switched reluctance motor further comprises a stator-rotor assembly which includes, intermediate the interfacing magnetic poles of the stator and rotor, an annular magnetic core structure mounted concentrically with respect to the rotor axis whereby radial segments of this core form part of the flux path of the motor-driving magnetization, and means for magnetizing the magnetic core structure around its closed annular flux path to bias its magnetization to a state above the knee of the B-H magnetization curve.

This provides a good flux path for the above-the-knee B-H bias magnetization, but if the stator itself is also annular, as is usual in reluctance motors, the flux path through the stator poles is not optimum from the viewpoint of iron loss reduction. Therefore, according to a still further feature of the invention, a switched reluctance motor comprises a stator-rotor assembly which has two sets of magnetic poles axially spaced along the rotor axis, the stator poles being formed on axially extending stator members so that a closed magnetic circuit linking the poles can include radial paths through the rotors and axial stator paths, and the stator-rotor assembly further comprises, intermediate the interfacing magnetic poles of the stator and rotor, two annular magnetic core structures, one for each set of poles, mounted concentrically with respect to the rotor axis, whereby radial segments of each core form part of the magnetic circuit flux path of the motor-driving magnetization, and means for magnetizing the magnetic core structures around their closed annular flux paths to bias their states of magnetization above the knee of the B-H magnetization curve.

An alternative to the annular form of bias member involves the use of bridging core members which cater for a dc flux bias in the axial stator paths but divert this dc flux away from the rotor. Thus, according to another feature of the invention, the stator-rotor assembly has two sets of magnetic poles axially spaced along the rotor axis, the stator poles being formed on axially extending stator members so that a closed magnetic circuit linking the poles can include radial paths through the rotors and axial stator paths, and the stator-rotor assembly further comprises other axially extending stator members each of which forms with a corresponding first-mentioned axially extending stator member a closed magnetic circuit for D.C. magnetic flux, there being inductive reaction filter means connecting the axially extending stator members for restraining passage of ac magnetic flux, and means for producing a dc magnetic flux magnetizing at least the first mentioned axial stator members above the knee of the B-H magnetization curve.

Since the thermodynamic properties exploited by the above-the-knee B-H magnetization by the techniques of this invention require the reluctance motor function, the resulting power can either be harnessed mechanically by drawing power from the motor drive shaft or some or all of the output energy can be extracted by a direct electrical power generation function.

In the latter situation a feature of the invention provides that, in the switched reluctance motor, the rotor and stator both have salient ferromagnetic poles and further comprise electrical regeneration means for harnessing the mechanical rotor torque produced, which includes a load circuit connected to an output winding inductively coupled to draw power from the rotation of the rotor, the connection between the load circuit and the output winding being commutated by said commutator means in anti-phase with the switching of the supply magnetizing the poles, whereby during one full cycle of the ac supply power is supplied to the motor action and power is drawn from the output winding during the next full cycle of the ac supply.

According to a feature of the invention as applied to this latter form of motor, the motor-driving magnetization of the poles involves the excitation of an input winding mounted on the stator, which winding also serves as the output winding, said commutator means including switch circuits which segregate the actions of drawing power from the ac supply and supplying regenerated power to the load circuit, said commutator means being operative to confine current flow in the output winding to periods exclusive of those of motor-driving magnetization, characterized in that the A.C. voltage source supplying the motor driving magnetization is commutated in periods that are full cycles of the ac voltage source.

Concerning the regeneration of electric power from the motor drive, the least complicated implementation of the invention is one in which the reluctance motor drives an alternator or generator of conventional design. In this case, in order to provide for smooth loading on the ac power supply and smoother mechanical conditions, it is desirable to connect the generator to two reluctance motors or to a composite machine which effectively comprises two such motors.

Thus, according to another aspect of the invention, a switched reluctance motor-generator system powered by an ac voltage source having a frequency which is a constant integer multiple of the synchronous operating speed of the motor, has two reluctance motors mechanically coupled to drive an electric power generator, each reluctance motor comprising a rotor and a stator, both having ferromagnetic poles which come into register cyclically at successive angular positions of the rotor, means for producing an ac magnetic flux component of the motor-driving magnetization of the poles limited in duration to a range of angular position of the rotor in advance of positions in which the poles come into register, and non-commutated magnetizing means for biasing at least a portion of the flux path of the motor-driving magnetization to a state above the knee of the B-H magnetization curve, the system having commutator means for controlling a commutated supply of the ac voltage source to each reluctance motor operative to magnetize the poles of one motor for one full ac cycle which terminates when the poles are in register and to input no further power to that motor during an immediately following full cycle period during which the other motor is receiving its full cycle of power, whereby collectively the motors share in absorbing a continuous power input from the ac source.

As already stated, the use of salient poles or the magnetic equivalent is essential to secure the drive action of the reluctance motor which allows the ferromagnetic substance of the stator and core to contribute to the magnetic-motive actions which improve the performance of the machine. By appropriate commutation of the motor excitation, the production of a retarding reluctance torque is minimized, but electrical power can still be drawn from the machine by use of the separate output windings. The invention provides that these should also be subject to co-ordinated commutation so as to preclude direct transformer coupling with the input energization, which would reduce overall efficiency.

Preferably, any input windings used to energize the machine and the output windings, if separate, should be very closely coupled inductively by mounting them adjacent one another on the stator sections feeding magnetic flux to the same poles.

By 'adjacent' is meant either next to one another but sharing a common axis or, for example, they could be concentric solenoidal windings assembled one inside the other.

Implementations of the invention also extend to combinations of the basic machine properties with techniques for making the machine torque more uniform throughout the rotation cycle. Thus, the machine can have a slightly different number of rotor and stator poles in such configurations that they come into register at different times. Such implementations will, however, not be described or specifically claimed, because they can be readily contemplated by those skilled in the electrical engineering art, given the disclosure of the basic invention here claimed.

BRIEF DESCRIPTION OF THE DRAWINGS

The various aspects of the invention, which include a possible design of the electronic commutator means, will now be described by reference to the accompanying drawings, in which:

FIG. 4 shows a hypothetical B-H curve, FIG. 5 shows B-H curves for a grain-oriented silicon-steel, FIG. 6 depicts two commutated voltage waveforms, FIG. 7 shows a sectional view of a form of reluctance motor using the principles of the invention, FIG. 8 shows a schematic motor-generator system with full cycle commutation, FIG. 9 shows a sectional plan view of a multi-motor system, FIG. 10 shows a sectional front elevation view of the multi-motor system of FIG. 9, FIG. 11 shows a sectional view of a motor with an annular core providing the magnetic bias and FIG. 12 shows a schematic motor-generator system in which the motors also act as generators.

DETAILED DESCRIPTION OF THE INVENTION

Figure 1:
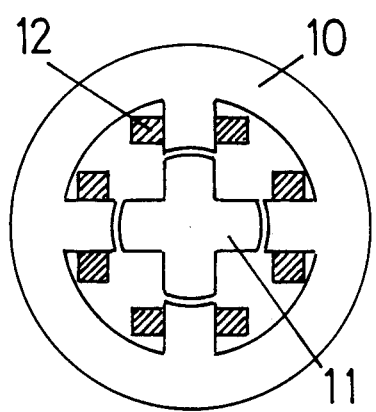
FIG. 1 shows schematically a salient pole configuration with the stator and rotor poles in register.

Referring to FIG. 1 a dynamo-electric machine comprises a stator 10 having four salient poles disposed around a rotor 11 having also four salient poles. Both stator and rotor comprise ferromagnetic laminations separated by insulation with their planes perpendicular to the axis about which the rotor rotates. Four series-connected windings such as 12 are mounted on the stator poles to provide excitation around four magnetic circuits including the rotor poles, there being one such circuit in each quadrant of the system core configuration shown.

Figure 2:
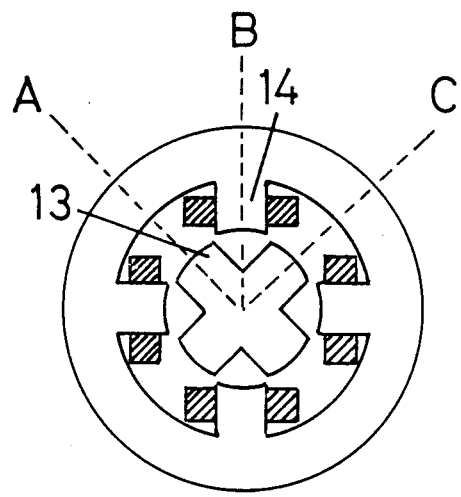
FIG. 2 shows the same configuration with the rotor poles midway between in-register positions with the stator poles.

When the rotor has an angular position midway between adjacent positions in which the stator and rotor poles are in register, as depicted in FIG. 2, excitation of the core by energizing the magnetizing windings causes the rotor poles and stator poles to be mutually attracted. This causes the rotor to turn to a position in which the poles are in register as in FIG. 1.

By de-energizing the magnetizing windings when the rotor comes to this position, the inertia of the rotor causes it to move freely to the next position corresponding to FIG. 2. The removal of the magnetizing field has removed the powerful force of attraction between the rotor and stator poles. Upon reaching the new position corresponding to FIG. 2, re-energization drives the rotor through another quarter revolution, and so on. This, essentially, is the principle of operation of the reluctance motor.

Figure 3:
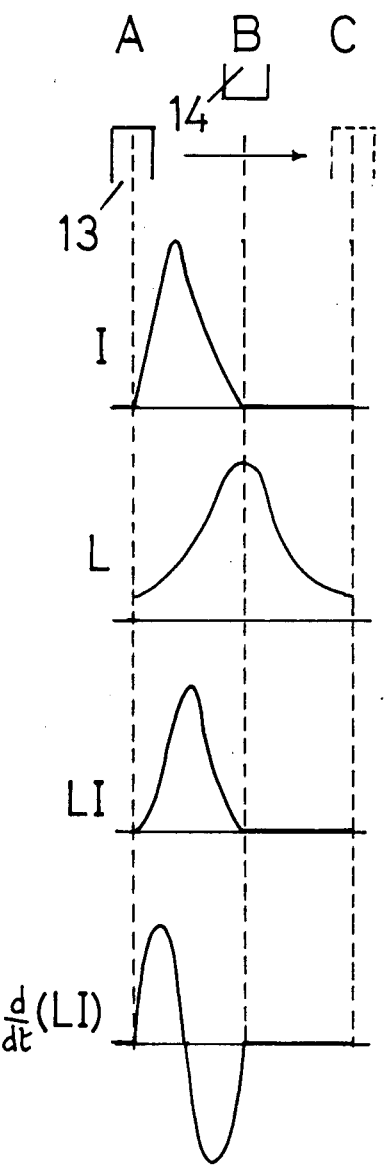
FIG. 3 shows the electrical waveforms applicable to the excitation of the poles by an alternating current supply, in one particular embodiment of the invention.

FIG. 3 illustrates a method of controlling the energization sequence. The waveforms shown illustrate how certain electrical quantities vary as the poles move from a position shown in FIG. 2, through the position shown in FIG. 1 and on to the position shown in FIG. 2 again. This motion corresponds to advance of the rotor pole at A, denoted 13, to a position B in register with the stator pole, denoted 14, to a position C. The corresponding positions A, B and C are also shown in FIG. 2.

At time corresponding to position A, the applied voltage waveform of the signal used to energize the windings 12 changes from its steady value of zero to oscillate once only through a complete cycle, as shown in the lowermost part of the figure, so as to complete the cycle at position B. This waveform is denoted as the time (t) rate of change of the product of L and I, where L denotes the inductance of the four series-connected windings and I is the magnetizing current carried by the windings. For the purpose of illustration the resistance of these windings is deemed to be negligible. Hence the applied voltage will equal the back EMF represented by this rate of change quantity.

Integration of this voltage gives the waveform LI, as shown. Also, the inductance L is shown to vary symmetrically about the central position B, being highest when the poles are in register and dropping off rapidly as the poles move out of register. From these data one can see that the current I must have a form which rises rapidly as the poles come together but peaks well before the poles are in register and drops to zero at the position B. Essentially, the rate of change of flux linking the poles, as measured by the back EMF, is sinusoidal over the range A to B. This EMF corresponds to a portion of an applied voltage which has been gated to admit only one full cycle.

The principal advantage of this method of excitation is that the flux changes are compliant with a sinusoidal voltage waveform and result in minimal eddy-current losses, bearing in mind that the excitation is switched off for half the time. These losses are less than they would be if, for example, a dc energization were used and switched on and off abruptly at the appropriate rotor positions by the commutation means. Also, the commutation method proposed here switches the current on and off as it passes through zero, which is also when the voltage is zero.

The concept of controlling an induction motor or a synchronous motor by commutating full cycles of the power voltage waveform is disclosed in the Ogle U.S. Pat. No. 3,307,094 and that specification discloses detailed circuitry which can be used to generate the full cycle commutated signal waveforms. It is fortuitous that the same commutation technique can be applied with unexpected advantage to the reluctance motor, which benefits from a power-on phase just in advance of in-register pole positions and a power-off phase in the immediately following period of pole separation. Such an application is not suggested by Ogle.

By way of example of such an application, Ecklin in U.S. Pat. No. 4,567,407 suggests a dc commutation confined to supply power during a range from 30 to 10 degrees of angle before pole in-register states. This is in a four pole machine. One could, therefore, use the Ogle power commutation technique controlled to allow one full cycle in four to power the reluctance motor, with the phase regulated so that the power is on between 30 and 7.5 degrees in advance of the in-register pole position. This constitutes a novel non-obvious combination, because, whereas a variation of the 4:1 commutation ratio using the Ogle technique would allow a constant frequency ac supply to control the speed of the reluctance motor, it is by no means obvious to use a fixed commutation ratio to achieve optimum performance from a reluctance motor-generator operating at constant speed.

In the embodiments of the invention to be described the commutation ratio is a 2:1 ratio, because the use of ac means that the magnetic flux depicted by LI in FIG. 3 is not that produced by a dc state. The active strength of the flux condition is more confined in angular spread than applies where dc is commutated and so a larger commutation angle can be used.

From a circuit design point of view this 2:1 ratio makes it possible to generate a signal having a control frequency half that of the main ac power and use this to control silicon controlled rectifier or triac devices to provide the full cycle commutation.

The thermodynamic aspect of the invention, which requires the magnetic bias feature, will now be described by reference to FIG. 4. The B-H magnetization curve of a ferromagnetic substance involves a steep initial portion of high permeability. This corresponds to the reversal of flux in domains in the crystalline structure of the substance. The spins which power the ferromagnetic action merely reverse direction and so the energy density in their domains is not changed. Any external power supplied by a magnetizing winding merely sets up magnetomotive forces which overcome the demagnetizing effects owing to air gaps and non-linearities in the magnetic circuit. This external power does all the work in the air gaps which define the poles in a motor.

Once the knee of the B-H curve is reached at about 70% of saturation in a polycrystalline untreated ferromagnet of high permeability, the onward magnetization arises from flux rotation in the magnetic domains. This stage is the active range depicted in FIG. 4, centered on a magnetic field H' and a corresponding magnetic flux density B'. Over this range B increments a hundred fold for corresponding changes in H and it is therefore permissible to approximate B as the full field contribution of the ferromagnet, whereas in fact its contribution to B is less by the amount H.

The work done in overcoming forces between poles providing the air gap reluctance is, over this above-the-knee range of magnetization, a shared effort between the external field source of H and the actions which power the natural spins in the ferromagnet. This work is represented by two shaded areas in FIG. 4, where the broken lines bound the range $\Delta B$ of an ac flux component centered on B', corresponding to a range $\Delta H$ of an ac field component centered on H'. The work done by the external power source, additional to that of securing the bias condition, is simply proportional to H' times the flux change $\Delta B$. The corresponding amount of work done by the ferromagnet itself is B' times $\Delta H$. The upper shaded area is a measure of the external work and the lower shaded area is a measure of the work done by the ferromagnet.

Note that there is much greater energy supplied by the ferromagnet than is drawn from the external power. The ratio is a measure of the capacity there is for drawing on the magneto-caloric action and so recovering thermal energy by cooling the ferromagnet. The hysteresis and eddy current losses involved become a retrievable source of energy, provided all the work is done above the knee of the B-H curve and provided useful work is extracted, as from the reluctance torque of a motor, on the up part of the B-H cycle and not returned by reluctance drag on the down part of the B-H cycle.

FIG. 5 shows B-H curves applicable to a grain-oriented 3.2% silicon-iron sheet steel, which has been severely cold-worked and heat treated in a hydrogen atmosphere at high temperature. The recrystallization upon cooling causes the crystals and so the magnetic domains to become oriented in relation to the rolling direction and the plane of the sheet. Thus the broken curve applies for fields directed along the direction in which the sheets are rolled, whereas the full curve applies to magnetization transverse to the rolling direction. Comparison between FIGS. 4 and 5 shows that a greater power gain factor for lower bias field can be expected from the broken curve which has the higher knee. In these two cases the knee is where the lines begin, the steep initial portion of the B-H curves not being shown. A design consideration is that the cycle range of the flux density B governs the scope for extracting power mechanically via the reluctance motor drive.

It can be seen that a very substantial bias flux is needed to set up the condition where optimum use of the power gain of the invention is secured. If the reluctance motor is operated without bias, then the magnetization will cycle symmetrically about the origin of the B-H curve. There will still be power gain from thermodynamic sources if the motor operates using a B-H cycle of amplitude well above the knee of the B-H curve, but the hysteresis losses and eddy current losses will then detract appreciably from the overall performance.

The scale for B in FIG. 5 covers the range 0 to 2 weber per square meter and the scale for H is 0 to 200 amps per cm.

The ac waveform needed to power the reluctance motor in all embodiments of the invention disclosed in the drawings has the form shown in FIG. 6. Here there are two such waveforms presented such that together they represent a continuous noncommutated ac signal.

FIG. 7 presents a section of a reluctance motor which has axially extending laminated ferromagnetic stator pole members 20 and a shaft 21 having poles on two axially spaced laminated ferromagnetic rotor members 22. In side elevation the rotor would resemble the view shown in FIG. 1, but the stator is composed in this case of flat rectangular elements which form a magnetic circuit for motor-driving magnetization via the two rotor members 22.

This circuit is magnetized by energizing the stator windings 23 and an ac power supply having a voltage as represented by either signal waveform in FIG. 6 will drive the motor when the full cycle of the ac voltage waveform is supplied in the period in advance of the in-register pole position and phased so that the power-off state occurs in the period just after the in-register pole position.

If the cyclic ac magnetization of the stator members is such that the stator pole member 20 is driven to a range of magnetization above the knee of the B-H curve, the process described by reference to FIG. 4 will come into effect. It is, however, preferable, from the viewpoint of efficiency, to bias the stator pole members 20 so that the ac flux cycles in a confined region above the knee of the B-H magnetization curve. One way to assure this is to provide the ferromagnetic shunt members 24 which are magnetically coupled with the members 20 via solid ferromagnetic bridge members 25. These latter members, being solid rather than laminated, will, at power frequency, tend to block any ac magnetic flux by eddy-current skin effects but will admit dc magnetic flux. Accordingly, with the added bridge members just described a magnetic route for dc flux is provided so that the members 20 can have a dc flux bias which does not all penetrate into the rotor members. More important, however, the dc polarization of members 20 flux is maintained when the pole separation ruptures the flux path for the motor-driving magnetization. This reduces the hysteresis effects considerably.

The dc bias can be provided by special dc powered windings on the stator adjacent windings 23. Alternatively, the bridge members 25 can be permanent magnets as illustrated in FIG. 7. The ferromagnetic shunt members will, in this configuration, be of an easily magnetized ferromagnetic form not approaching saturation since there is no advantage in having the shunt path operative above the knee of the B-H curve.

There is an exception to this in the multi-motor system to be described below, where the shunt members of one motor are the active stator members of another motor.

Referring to FIG. 8, a motor-generator system is shown to comprise two reluctance motors 30 and 31, both incorporating the invention and having output shafts 32, 33. Each motor has two power leads which are connected internally to the stator winding providing the motor excitation. The leads are denoted 34, 35 for motor 30 and 36, 37 for motor 31. The motor 31 is deemed to supply mechanical output power via its shaft 33, which power is assumed to be harnessed solely for mechanical purposes. The motor 30, however, serves a power regeneration function by being mechanically coupled to an ac generator 38. This is so synchronized and phased in operation that it can be connected to the bus bars 39 supplying power to and from the ac mains power supply 40.

The power from this bus bar is supplied to each motor via a triac control device 41, 42 and the triacs, as gated electronic switching devices, operate to throughput power of either polarity when a strong enough gating signal is applied. To this end an alternator 43 is connected to the drive shaft of motor 30 and its connection to the generator 38 via the phase-adjusting mechanical shaft coupling 44. The screw locking of the relative angular positions of the alternator and generator shafts determines the relative phasing of the signal waveform produced as alternator output and the angular position of the rotor poles in reluctance motor 30.

The synchronous alternator 43 has half the number of poles as synchronous generator 38 and so produces an ac signal of exactly half the frequency of the mains power supply 40. This signal is divided into two gating signals by half wave rectifiers 45, 46 and the respective signals are connected to gate the operation of the triac devices 41, 42. Thus, motor 30 has power on and receives a full cycle of the mains power supply when motor 31 has power off and vice versa.

In operation, this motor-generator system can use power supplied by the supply 40 to generate mechanical output via shaft 33, whilst heat generated in powering motor 30 at magnetization levels which generate appreciable hysteresis and eddy current losses can be recovered as electrical power via generator 38.

Referring now to FIG. 9, a multi-motor system is described which is uses essentially a two-pole rotor configuration and so could not be coupled to an alternator such as 43 unless 2:1 gearing were to be used to step down the speed and so permit the half frequency control signal generation. Alternatively, solid state electronic circuitry could be designed by those skilled in the art, bearing in mind the disclosure by Ogle in U.S. Pat. No. 3,307,094. The structure shown in FIG. 9 aims to show how a large installation could be adapted from the form in FIG. 7 to use axial stator pole members 20 which can serve a dual purpose as the FIG. 7 shunt members 24 for an adjacent motor.

The multi-motor system shown in FIG. 9 has four windings 23 for powering the three motors. The two outer windings control the magnetization of the two outer motors, respectively, and the two inner windings augment one another in providing the motor-driving magnetization for the middle motor. In operation, the outer motor pair are powered by an ac voltage waveform represented by the upper signal waveform in FIG. 6, whereas the middle motor is driven by an ac voltage waveform represented by the lower part of FIG. 6. Therefore, the rotors 21 of the outer motors will have their poles in-register with the stator poles when the rotor of the inner motor has its poles fully out of stator pole register. This is illustrated in FIG. 10. The feature of the multi-motor system of FIG. 9 and FIG. 10 is that there can be a strong magnetic polarization as a bias action around the magnetic circuit including two members 20, but the ac flux components carried by these members are diverted through the rotors to drive the reluctance motors in a pure ac mode drawing partly on the thermodynamically sustained ferromagnetic spin power of members 20.

A different motor configuration is shown in FIG. 11. This uses axial stator pole members 50 interacting with a rotor 51, forming part of an axially spaced pair as in FIG. 7, but intermediate the rotor poles and stator poles there is an annular ring member 52. This ring member is laminated in planes parallel with the rotor laminations. Therefore, ac magnetic flux can easily traverse the annular ring member 52. The motor is driven by power supplied with the same full cycle commutation as already described by reference to FIGS. 1 to 3, this power feeding windings 53 on the axial stator members 50. However, in this case the bias of the ferromagnetic state is produced by a magnetic polarization around the annular ring member 52. This can incorporate permanent magnets in the regions 54 marked N-S or these regions can be the seat of activation by dc windings (not shown). The bias magnetization serves to polarize all the magnetic domains in the member 52 so that all magnetic action lateral to the ring circumference will involve flux rotation rather than spontaneous flux reversal by domain wall displacement. This means that reluctance motor can function in the normal way by seeing the radial portions of the annular members intermediate the stator and rotor poles as a ferromagnetic path, but the magnetomotive force acting across the polar air gaps is partly powered by the thermodynamic contribution made by the above the B-H knee ferromagnetic spin alignment.

Referring now to FIG. 12, it is to be noted that the motor action described involves a measure of power regeneration in a system which is full cycle ac commutated and which uses a single motor winding for power drive purposes. It is within the scope of the invention for the electrical power regeneration feature to be incorporated in the motor itself. Thus, in FIG. 12, there are two motors in a configuration similar to that of FIG. 8, but the generator is eliminated. Instead, the single winding of motor 30 is connected to two triac control devices 60 so controlled that the motor receives power for one full ac cycle and then is connected to supply power to a load circuit 61 during the next full ac cycle. The other motor 31 operates in complementary manner so that it absorbs power when the motor 30 outputs power and it outputs power to the load when the motor 30 is absorbing power. The commutation control for switching this circuit action is the same as that used in FIG. 8. The alternator 62 generates the ac gating control signal at half the ac supply frequency and differs from alternator 43 of FIG. 8 in that it has two identical electrically isolated outputs for separate circuit connection to the triac pairs.

Whereas the motor energization has been described by reference to a single power winding for activating the ac magnetic flux cycle, it is to be understood that the winding could comprise several different winding sections connected in series or parallel and that different windings could be used for power input and power output, particularly if voltage isolation is important. Such design variations will be evident to those skilled in the electrical engineering art.

I claim:

1. A switched reluctance motor powered by an ac voltage source having a frequency which is a constant integer multiple of the synchronous operating speed of the motor, comprising a rotor and a stator, both having ferromagnetic poles which come into register cyclically at successive angular positions of the rotor, means for producing an ac magnetic flux component of a motor-driving magnetization of the poles limited in duration to a range of angular position of the rotor in advance of positions in which the poles come into register, means for harnessing the mechanical rotor torque produced, commutator means for controlling a commutated supply of the ac voltage source operative to magnetize the poles for one full ac cycle which terminates when the poles are in register and to input no further power during an immediately following full cycle period, and additional non-commutated magnetizing means for biasing at least a portion of the flux path of the motor-driving magnetization to a state above the knee of the B-H magnetization curve.

2. A switched reluctance motor according to claim 1, comprising a stator-rotor assembly which includes, intermediate the interfacing magnetic poles of the stator and rotor, an annular magnetic core structure mounted concentrically with respect to the rotor axis whereby radial segments of this core form part of the flux path of the motor-driving magnetization, and means for magnetizing the magnetic core structure around its closed annular flux path to bias its magnetization to a state above the knee of the B-H magnetization curve.

3. A switched reluctance motor according to claim 2, comprising a stator-rotor assembly which has two sets of magnetic poles axially spaced along the rotor axis, the stator poles being formed on axially extending stator elements so that a closed magnetic circuit linking the poles can include radial paths through the rotors and axial stator paths, the stator-rotor assembly further comprising, intermediate the interfacing magnetic poles of the stator and rotor, two annular magnetic core structures, one for each set of poles, mounted concentrically with respect to the rotor axis, whereby radial segments of each core form part of the magnetic circuit flux path of the motor-driving magnetization, and means for magnetizing the magnetic core structures around their closed annular flux paths to bias their states of magnetization above the knee of the B-H magnetization curve.

4. A switched reluctance motor according to claim 1, comprising a stator-rotor assembly which has two sets of magnetic poles axially spaced along the rotor axis, the stator poles being formed on axially extending stator members so that a closed magnetic circuit linking the poles can include radial paths through the rotors and axial stator paths, the stator-rotor assembly further comprising other axially extending stator members each of which forms with a corresponding first-mentioned axially extending stator member a closed magnetic circuit for dc magnetic flux, there being inductive reaction filter means connecting the axially extending stator members for restraining passage of ac magnetic flux, and means for producing a dc magnetic flux magnetizing at least the first mentioned axial stator members above the knee of the B-H magnetization curve.

5. A switched reluctance motor according to claim 4, which forms part of a multi-motor system comprising at least two such reluctance motors which share a closed magnetic circuit including an axially extending core member forming a stator pole pair for one motor and an axially extending member forming a stator pole pair for the other motor.

6. A switched reluctance motor according to claim 4, which forms part of a multi-motor system comprising at least two such reluctance motors which share a closed magnetic circuit including an axially extending stator member forming a stator pole pair for one motor and an axially extending stator member forming a stator pole pair for the other motor, the system having commutator means for controlling the commutated supply of the ac voltage source to each reluctance motor operative to magnetize the poles of one motor for one full ac cycle which terminates when the poles are in register and to input no further power to that motor during an immediately following full cycle period during which the other motor is receiving its full cycle of power, whereby collectively the motors share in absorbing a continuous power input from the ac source.

7. A switched reluctance motor according to claim 1 having electrical power regeneration capacity, in which the rotor and stator both have salient ferromagnetic poles and further comprising electrical regeneration means for harnessing the mechanical rotor torque produced, which includes a load circuit connected to an output winding inductively coupled to draw power from the rotation of the rotor, the connection between the load circuit and the output winding being commutated by said commutator means in anti-phase with the switching of the supply magnetizing the poles, whereby during one full cycle of the ac supply power is supplied to the motor action and power is drawn from the output winding during the next full cycle of the ac supply.

8. A switched reluctance motor according to claim 7, wherein the motor-driving magnetization of the poles involves the excitation of an input winding mounted on the stator, which winding also serves as the output winding, said commutator means including switch circuits which segregate the actions of drawing power from the ac supply and supplying regenerated power to the load circuit, said commutator means being operative to confine current flow in the output winding to periods exclusive of those of motor-driving magnetization, characterized in that the ac voltage source supplying the motor driving magnetization is commutated in periods that are full cycles of the ac voltage source.

9. A switched reluctance motor according to claim 2, in which a plurality of permanent magnets, forming part of the annular core structure and positioned in parts of the annular core spaced from positions in which the stator and rotor poles are in register, provide a magnetic field bias around the annular core.

10. A switched reluctance motor according to claim 4, in which the inductive reaction filter means connecting the axially extending stator members for restraining passage of ac magnetic flux comprises a solid non-laminated ferromagnetic core members which are also permanent magnets providing a magnetic bias around the closed magnetic circuit of the axially extending stator elements.

11. A switched reluctance motor-generator system powered by an ac voltage source having a frequency which is a constant integer multiple of the synchronous operating speed of the motor, having two reluctance motors mechanically coupled to drive an electric power generator, each reluctance motor comprising a rotor and a stator, both having ferromagnetic poles which come into register cyclically at successive angular positions of the rotor, means for producing an ac magnetic flux component of the motor-driving magnetization of the poles limited in duration to a range of angular position of the rotor in advance of positions in which the poles come into register, and non-commutated magnetizing means for biasing at least a portion of the flux path of the motor-driving magnetization to a state above the knee of the B-H magnetization curve, the system having commutator means for controlling a commutated supply of the ac voltage source to each reluctance motor operative to magnetize the poles of one motor for one full ac cycle which terminates when the poles are in register and to input no further power to that motor during an immediately following full cycle period during which the other motor is receiving its full cycle of power, whereby collectively the motors share in absorbing a continuous power input from the ac source.

12. A switched reluctance motor powered by an ac voltage source having a constant frequency which is a constant integer multiple of the constant synchronous operating speed of the motor, comprising a rotor and a stator, both having ferromagnetic poles which come into register cyclically at successive angular positions of the rotor, means for producing an ac magnetic flux component of the motor-driving magnetization of the poles limited in duration to a range of angular position of the rotor in advance of positions in which the poles come into register, means for harnessing the mechanical rotor torque produced, and commutator means operative with the motor running at its constant synchronous speed for commutating a supply of the ac voltage source to magnetize the poles for one full ac cycle which terminates when the poles are in register and to input no further power during an immediately following full cycle period.

13. A switched reluctance motor according to claim 2, powered by an ac voltage source having twice the frequency characteristic of normal non-commutated synchronous motor operation, comprising means for producing an ac signal having half the frequency of the ac voltage, phase regulating means responsive to the angular position of the motor rotor for ensuring that this ac signal has a phase related to that angular position, means for half-wave rectifying said ac signal to produce gating signals of full cycle duration of the ac voltage source, spaced by similar full cycle periods, said commutator means including switches operated by said gating signals to admit full cycle commutated power to the motor in advance of positions in which the poles come into register and to inhibit such supply of power for a full cycle following the in-register pole position.

14. A switched reluctance motor according to claim 3, in which the ac signal having half the frequency of the ac voltage powering the motor is generated by an auxiliary synchronous alternator coupled to a common rotor shaft and so mechanically driven by the motor, said phase regulating means responsive to the angular position of the motor rotor comprising an adjustment means in the coupling for adjusting the relative angular positions of the motor rotor and alternator rotor.

15. A switched reluctance motor powered by an ac voltage source having a constant frequency which is a constant integer multiple of the constant synchronous operating speed of the motor, comprising a rotor and a stator, both having ferromagnetic poles which come into register cyclically at successive angular positions of the rotor, means for producing an ac magnetic flux component of the motor-driving magnetization of the poles limited in duration to a range of angular position of the rotor in advance of positions in which the poles come into register, means for harnessing the mechanical rotor torque produced, and commutator means operative with the motor running at its constant synchronous speed for commutating a supply of the ac voltage source to magnetize the poles for one full ac cycle which terminates when the poles are in register and to input no further power during an immediately following full cycle period, the amplitude of the ac voltage source being high enough to assure that at least a portion of the flux path of the motor-driving magnetization is magnetized between the knee of the B-H curve and saturation during the periods when the motor produces its drive torque.

\* \* \* \* \*